Feb. 7, 1961   P. W. DOUGLASS   2,970,427
CONSTANT TORQUE ESCAPEMENT
Filed March 28, 1957
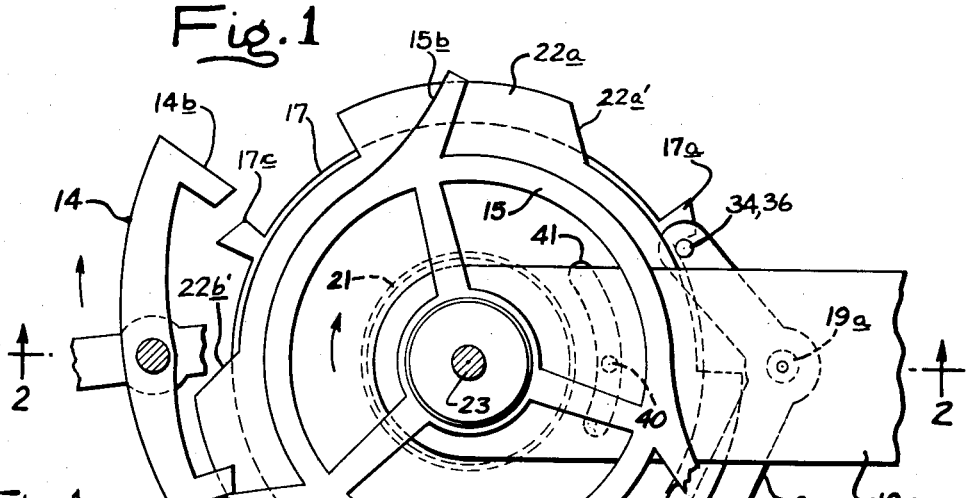
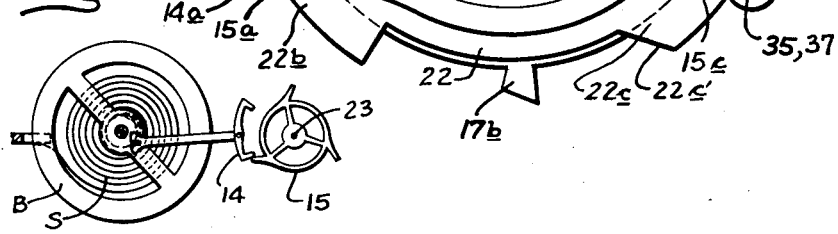
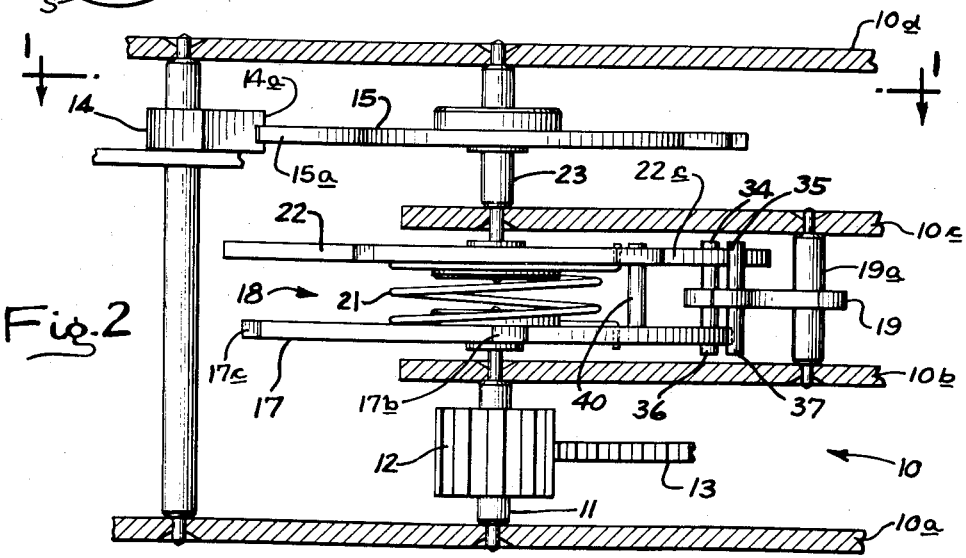
INVENTOR
PAUL W. DOUGLASS
ATTY.

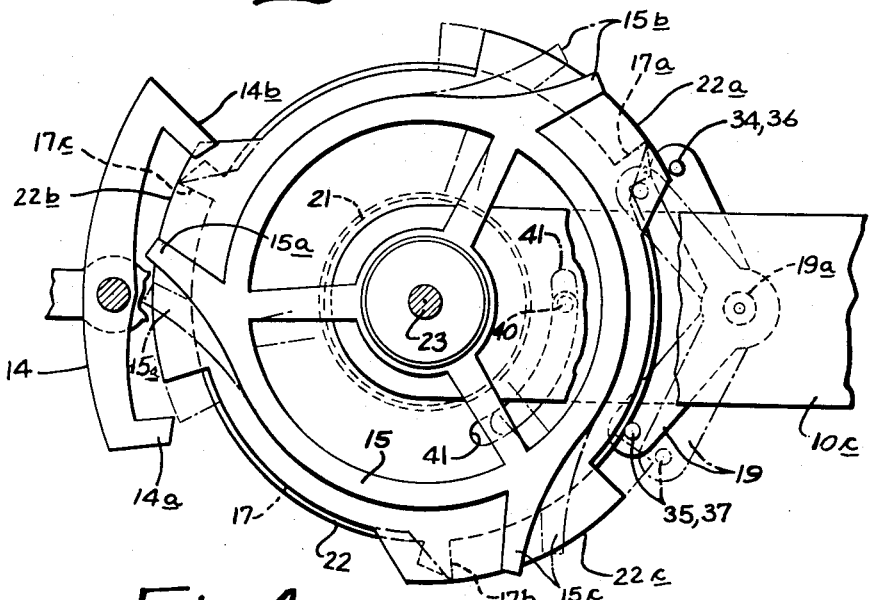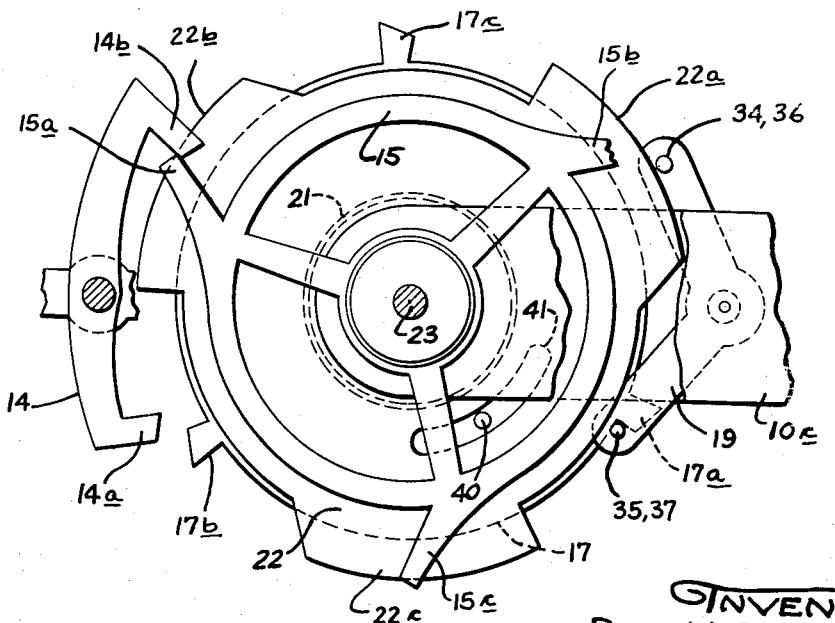

United States Patent Office 2,970,427
Patented Feb. 7, 1961

2,970,427
CONSTANT TORQUE ESCAPEMENT
Paul W. Douglass, Goshen, Ind., assignor to General Time Corporation, New York, N.Y., a corporation of Delaware Filed Mar. 28, 1957, Ser. No. 649,046
9 Claims. (Cl. 58—117)

This invention relates to mechanical timing devices, and more particularly to improvements in escapements.

It is a general object to provide an escapement mechanism suited particularly for maintaining a constant timekeeping rate for time devices driven by a primary power source, like a hand-wound spring motor, which is characterized by large variations in torque output. As the unwinding of the spring of a spring motor proceeds, the torque output level decreases such that when the spring is run down the torque output is correspondingly low. Ordinarily, the timekeeping rate of an escapement varies somewhat depending upon the input torque supplied to drive it. The present device overcomes such variation by novel means providing effective isolation between the main spring and controlling escapement. It is a more specific object of this invention to provide an escapement mechanism in which a master or control escapement operates independently of the torque output level of the power source, enabling high timekeeping accuracy with even the simplest power spring and driving train arrangements.

It is a further object to provide a novel escapement mechanism which includes a master escapement and a slave escapement with the master escapement being driven by a spring of constant average torque and with the master arranged to unlock the slave, impulse by impulse.

It is a related object to provide a construction in which the spring of the master is kept wound to the same degree regardless of the amount of torque applied to the mechanism as a whole. It is a more detailed object to provide an escapement mechanism of the above type which utilizes the movement of the slave escapement to maintain the spring of the master escapement wound to a predetermined degree.

It is a still further object to provide an escapement mechanism which has wide application and which may be used with a balance, a pendulum, or any equivalent oscillatory system. It is another object to provide a high accuracy escapement mechanism which is of extremely sturdy and durable construction, which makes use of simple, low cost components, which is easily assembled, and which may be depended upon to operate without maintenance over long periods of time. As a result, it is an object to provide a timing mechanism which is particularly well suited to exacting military and commercial uses.

Additional objects will appear from the following description, taken in connection with the accompanying drawings, wherein:

Figure 1 is a plan view illustrating an escapement mechanism constructed in accordance with this invention and taken along the line 1—1 in Fig. 2;

Fig. 1a is a fragmentary view at reduced scale showing the manner in which the device of Figure 1 may be coupled to a balance;

Fig. 2 is a section taken in the plane of lines 2—2 of Figure 1; and

Figs. 3 and 4 are stop motion views illustrating the parts of the escapement of Figure 1 at successive points in the operating cycle.

While the invention is susceptible of various modifications and alternative constructions, there is shown in the drawings and will herein be described in detail a preferred embodiment. It is to be understood, however, that it is not thereby intended to limit the invention to the specific form disclosed, but, on the contrary, it is intended to cover all modifications, alternative constructions and equivalents falling within the spirit and scope of the invention as expressed in the appended claims.

Turning now to the drawings, Figures 1 and 2 illustrate a constant torque escapement mechanism embodying the present invention. The mechanism to be described is mounted in a frame 10 made up of parallel plate members 10a—10d. Driving or input torque is applied via a pinion 12 supported on an arbor 11 and driven by gearing, a portion of which is indicated at 13. Such gearing may be connected to any primary power source of the type characterized by large variations in torque output, by way of example, a hand-wound spring.

The function of the escapement mechanism is to control the release of energy stored in the primary power source such that the arbor 11 turns at a constant timekeeping rate, this movement being transmitted to the clock or other time device through the gear train 13 connecting the primary power source and the driving pinion 12. This is accomplished by delivering impulses of uniform strength to a balance B (Fig. 1a) or equivalent device connected to the escapement pawl or verge 14 having a receiving pallet 14a and a leaving pallet 14b. The latter cooperate with an escapement wheel 15 having teeth 15a, 15b, 15c. The tips of the teeth and the tips of the pallets are so angled that as each tip is freed from a pallet a wiping engagement is imparted to the verge for impulsing the balance, first in one direction and then the other, the energy being stored in the hairspring S of the usual type which is connected to the balance and arranged adjacent to it. The escapement wheel 15, the pawl 14, and the balance B with its spring, taken together, will be referred to herein as the master or control escapement.

In carrying out the present invention, the master escapement is isolated from the primary power source by interposing a slave escapement which is, impulse by impulse, unlocked by the master and maintained in synchronism with it. In the present embodiment the slave escapement indicated generally at 18 includes an escapement wheel 17 having three teeth 17a, 17b, 17c and mounted on the arbor 11 which is coupled to the gear train 13. Cooperating with the escapement wheel 17 is a rocking pawl 19 in the form of a lever centrally pivoted on an arbor 19a. The pawl 19 is provided with a receiving pallet 36 and a leaving pallet 37. In the condition shown in Figure 1, the receiving pallet 36 is engaged with a tooth 17a on the escapement wheel 17.

For the purpose of operating the pawl 19 and thus unlocking the slave escapement wheel 17 at a timed rate in accordance with the movements of the master escapement wheel 15, a cam wheel 22 is provided having upraised cams 22a, 22b, 22c. To couple the cam wheel 22 to the pawl 19, spaced cam followers are used including a first cam follower 34 and a second cam follower 35 which are, for convenience in the present device, in respective alinement with the pallets 36, 37. Each of the cams has an inclined face as indicated at 22a', 22b', 22c'. Moreover, the span of the cam followers is slightly greater than the length of the cams 22a, 22b, 22c. Consequently as a cam strikes the first cam follower 34, the pawl 19 is rocked in the clockwise direction. When the inclined face strikes the second cam follower 35, the pawl 19 is rocked in the counter-clockwise direction. The corresponding rocking movements, as will be apparent, cause the teeth of the slave escapement wheel 17 to be released, one by one, for stepped advancement of the escapement wheel 17 and slow timed rotation of the gear train. Since the number of cams, three, is the same as the number of escapement teeth, the slave escapement is forced to rotate in step with the rotation of the master escapement. Moreover, since one cam follower is always opposite a cam periphery when the other is in the "valley" between two cams, the pawl member 19 is sequentially locked in its alternate positions. The significance of this will be more fully understood in reviewing a typical operating sequence at a later point.

Further in accordance with the invention, an auxiliary spring is used for coupling together the two escapements so as to apply a constant driving torque to the master escapement which is independent of the torque obtained from the primary power source, i.e., independent of the degree of wind of the mainspring. In the present instance, the auxiliary spring in the form of a light coil spring 21 is interposed between the slave escapement wheel 17 and the cam wheel 22 and anchored to both of them. This spring has a predetermined amount of initial "wind" so that a predetermined torque is applied to the master escapement wheel 15 sufficient to cause positive operation of the master escapement. As will be brought out more fully, the members 17 and 22 are caused to remain in step with one another; consequently a constant average torque is applied on a continuous basis to the master escapement wheel. Since the master escapement wheel is coupled to the driving train only through the auxiliary spring 21, it will be apparent that the torque applied to the master escapement wheel is limited to that which is transmitted through the spring 21 and thus independent of the torque derived from the mainspring or primary power source.

For the purpose of insuring that predetermined "wind" is maintained in the spring 21 even when the clock is stopped and to provide, nevertheless, for limited relative movement of the cam wheel 22 and escapement wheel 17 during each operating half cycle, a pin-and-slot connection is provided between them comprising a pin 40 on the wheel 17 and an arcuate slot 41 in the wheel 22.

The operation of the device described above will be apparent upon reviewing Figures 1, 3 and 4 which comprise stop motion views showing the positions of the parts during one half of a complete timing cycle. Prior to describing the operation, it will be helpful to have in mind the initial conditions. One of these initial conditions is that the auxiliary spring 21 has a predetermined degree of wind. It will also be assumed that the pawl 19 occupies its counterclockwise position in which the receiving pallet 36 engages the tooth 17a on the slave escapement wheel 17, thereby temporarily blocking the same against further movement. The pawl 19 is temporarily locked in this counterclockwise position since the second cam follower 35 engages the rim of the cam 22c on the cam wheel 22. It will furthermore be assumed that the balance lever occupies its counterclockwise position as shown in Fig. 1a, with the hairspring associated with the balance B stressed in the clockwise direction. Under such conditions the verge 14 occupies the position of Figure 1, with the receiving pallet 14a in position to block the tooth 15a on the escapement wheel 15.

Under the urging of the hairspring associated with the balance, the balance begins to move in a counterclockwise direction, rocking the verge 14 clockwise and withdrawing the receiving pallet from its blocking position relative to the tooth 15a of the master escapement wheel 15. Under the urging of the auxiliary spring 21, the freed master escapement wheel 15 begins one step of clockwise rotation. During the course of such movement, a wiping impulse is applied to the pallet 14a of the verge thus impulsing the balance and supplying the friction loss in the balance.

Still during the course of its movement, freed from the verge 14, from one position of impulse to the next, when the master escapement wheel reaches the position shown dot-dash in Fig. 3, the first cam follower 34 engages the inclined cam surface 22a' on the cam 22a. Up to the point where this contact takes place the slave escapement wheel 17 is temporarily blocked against movement by reason of the pallet 36 engaging the tooth 17a thereon. However, when the cam follower 34 is cammed upwardly on the surface 22a', the pawl 19 rocks into the rotated or clockwise position shown in full lines in Fig. 3. Such movement of the pawl 19 removes the pallet 36 from its obstructing position in front of the tooth 17a so that the escapement wheel 17 is free to advance under the urging of the torque which is applied to its pinion 12 by means of the gear train 13 from the primary power source.

Rotation of the escapement wheel 17 in the clockwise direction continues until the tooth 17a thereon strikes the leaving pallet 37 at the lower end of the pawl member 19. It may be noted that positive engagement between the tooth 17a and the leaving pallet 37 is assured by the fact that the pawl 19 is, during the forward movement of the escapement wheel 17, blocked in its rotated position by interference between the cam follower 34 and the cam 22a. During the time that the slave escapement wheel 17 is moving forwardly, the master escapement wheel 15 also moves forwardly in the direction of the leaving pallet 14b of the verge 14. Moreover, the balance B continues to rotate in a counterclockwise direction as a result of the wiping impulse previously applied by tooth 15a on the master escapement wheel 15. The effect of the movement of the balance is to rotate the verge 14 so that the leaving pallet 14b is in obstructing position relative to the tooth 15a. This obstruction shown in Fig. 4, completes one-half cycle of operation.

The sequence of events taking place in the next half cycle of operation will, for the most part, be apparent to one skilled in the art without necessity for a second complete set of stop motion views. Briefly stated, the balance B under the urging of its hairspring stops and then begins to rotate in the opposite or clockwise direction, thereby rocking the verge 14 so that the leaving pallet 14b on the verge permits the tooth 15a of the master escapement to be freed, the usual wiping engagement being imparted to the verge by the tip of the tooth 15a as the latter escapes. Rotation of the master escapement wheel 15 under the urging of its spring 21 produces corresponding clockwise rotation of the cam wheel 22 connected to it. Such rotation brings the tapered leading edge 22a' of the cam 22a into engagement with the second cam follower 35, freeing the first cam follower 34 for "drop-off." The resulting camming action rotates the pawl 19 counterclockwise. This causes the leaving pallet 37 to move out of its blocking position relative to the tooth 17a on the slave escapement wheel 17 so that the slave escapement wheel is free to begin a second step of forward movement under the urging of the torque applied through the gear train 13. Such movement continues until the tooth 17c strikes the receiving pallet 36. During the motion of the slave escapement wheel 17, the master escapement wheel 15 has continued to move until the tooth 15c strikes the receiving pallet 14a which, by this time, has, under the influence of the balance, rocked into obstructing position. At the completion of this second half cycle, all of the parts occupy the relative positions shown in Figure 1 except that both of the escapement wheels have been rotated forwardly one-third of a revolution from the position shown.

It is significant to note that the spring 21 which drives the master escapement wheel 15 is tensioned precisely to the same degree at the completion of the operating cycle that it was at the beginning of such operating cycle, since the phasing of the two members to which it is coupled, namely the two escapement wheels 15, 17, remains the same. Thus the amount of energy which the spring 21 is capable of imparting to the master escapement wheel 15 during the succeeding cycle is precisely the same as that which was imparted during the first cycle outlined above. This will hold true for the third and all succeeding cycles of operation, the tension of the spring 21 being independent of all factors except the phasing of the two escapement wheels. Since it is independent of all other factors, it is independent of the torque applied by the primary power source, i.e., the degree of wind of the main driving spring. In short, the master escapement is effectively isolated from the mainspring. Thus all succeeding cycles of operation will be identical to that described above as the degree of wind of the main spring, i.e., torque of primary power source, decreases. The mechanism will continue to run as long as the torque from the primary power source is sufficient, acting through the pinion 12, to advance the slave escapement wheel 17 when the same is unlocked by the pallets 36, 37 which alternately engage it, and as long as the torque from the primary power source is sufficiently great to wind the spring 21 during each half cycle of its operation. The winding of this spring 21 does not require much torque since it is of relatively light construction. However, in the event that the torque derived from the main power source does fall below the minimum level mentioned above, the mechanism will not run "slow" but will simply stop, clear indication that rewinding of the mainspring is necessary. The present clock thus possesses one of the main advantages of a synchronous electrically driven clock, namely, that as long as the mechanism is operating, precise timing is assured.

While the above operation has been described in connection with a spring balance timing element, it will be understood by one skilled in this art that this is simply exemplary and that the verge 14 may, if desired, be coupled to a pendulum or any other equivalent oscillating system.

Not only is the escapement mechanism of high inherent accuracy but it is of sturdy and durable construction enabling operation under conditions of shock and vibration frequently encountered in the use of devices for military purposes provided, of course, that durable stems and bearings of conventional type are provided for all of the moving elements. It is one of the features of the present device that simple, low-cost components are used, components of a type usually employed in the manufacture of mechanical clock mechanisms.

As has been previously mentioned, it is a feature of the device to supply the same amount of energy to the master escapement wheel 15 regardless of the torque or energy capabilities of the primary power source. Such power source may, and in the case of a spring, commonly does, have excess energy stored in it, that is to say, more energy than is required to operate the mechanism over a given interval of time. Since the mainspring spindle is positively geared to the escapement mechanism, and since all the energy must be used during a predetermined number of revolutions of the mainspring spindle, the question arises as to what happens to the excess of energy over and above the minimum requirement. In the case of conventional escapement mechanisms, a portion of such excess energy finds its way to the controlling escapement wheel and balance. Thus, at high torque a conventional escapement wheel steps at a faster rate and thus wipes the pallet surfaces of the verge with an overly forceful wiping action which causes an overly powerful impulse to be applied to the balance. This not only upsets the timing accuracy but causes banging between the escapement teeth and the pallets which is productive of unnecessary wear at a vital point. By contrast, in the present device excessive torque is evidenced as overly fast movement of the slave escapement wheel, not the master. Such movement does not affect the amount of energy imparted to the spring 21 since, as stated, this is dependent only upon the phasing of the elements to which it is connected and not dependent upon the torque of the mainspring. Such rapid movement does, however, dissipate energy at the pallets 36, 37 associated with the slave escapement wheel 17. Such pallets and the teeth of the escapement wheel may, however, be constructed as sturdily as necessary to absorb the surplus energy without objectionable wear, the important fact being that the master escapement wheel remains unaffected.

Assembly is easy and there are no parts requiring care or maintenance.

Moreover, while the operation has been described in connection with a manually wound spring as a primary power source, it is one of the features of the device that it is not dependent upon such particular primary source, and the torque, however it is derived, may vary upwardly as well as downwardly over wide limits upon passage of time without any effect upon the accuracy.

I claim as my invention:

1. In a constant torque escapement for a time device, means for obtaining a constant timekeeping rate by delivering impulses of uniform strength to an associated balance irrespectvie of variations in torque input comprising, in combination, a frame, a slave escapement mounted on said frame having a slave escapement wheel for driving from a primary power source, said slave escapement mechanism also being connected to the time device, a master escapement having a master escapement wheel for driving from said slave escapement, said master escapement also embodying a pawl engaging the master escapement wheel for receiving impulses for delivery to the said balance and, in turn, regulating the movement of the master escapement wheel, the said movement being intermittent and at a timekepeing rate, cam means including a rotatable cam mounted on the same axis as and actuated by the master escapement wheel and a cam follower mounted on the frame and actuated by said cam for regulating the timekeeping rate of movement of the slave escapement wheel, said slave escapement wheel having intermittent movement in synchronism with the movement of said master escapement wheel as determined by the said cam means, and torque transmitting means coupling said escapements, the said torque transmitting means sequentially storing energy, and transmitting energy so as to impress a substantially constant average torque on the master escapement.

2. In a constant torque escapement for obtaining a constant timekeeping rate of movement for a time device by delivering energy impulses of uniform strength to an associated balance irrespective of variations in torque input, in combination, a frame, a slave escapement mounted on said frame having a slave escapement wheel for driving from a primary power source, said slave escapement mechanism also being connected to the time device, a master escapement mounted on said frame having a master escapement wheel for driving from said slave escapement, said master escapement also embodying a pawl for receiving the impulses from the master escapement wheel for delivery to the said balance and, in turn, regulating the movement of the master escapement wheel, the said movement being intermittent and at a constant timekeeping rate, cam means actuated by the master escapement for releasing the said slave escapement wheel in accord with the timekeeping rate of the master, the said cam means including a cam mounted on the master escapement wheel and a movable cam follower mounted on the frame and operatively connected to said cam and said slave escapement wheel, said cam follower being actuated between impulses during periods of detached travel of the master escapement wheel, and torque transmitting means coupling said escapement, the said torque transmitting means furnishing energy for delivery to the balance.

3. In a timing device, in combination, a frame, a slave escapement wheel for driving from a primary power source, an escapement pawl adapted to engage said slave escapement wheel for controlling its release, a master escapement wheel arranged coaxially of said slave escapement wheel and an associated pawl, said last-named pawl receiving energy impulses as an incident to regulating the motion of the master escapement wheel for delivery to an associated balance, a resilient spring means between said escapement wheels for supplying a light, substantially constant torque to said master escapement wheel from said slave escapement wheel, and means for controlling the movement of said slave escapement pawl in accord with the motion of the master escapement wheel including a rotatable cam member mounted coaxially of the escapement wheels and a cam follower connected to said cam member and said slave escapement wheel, whereby uniform strength energy impulses are delivered to the balance associated with said master escapement wheel and motion at a constant timekeeping rate is obtained irrespective of variations in torque output of the primary power source.

4. In a timing device, in combination, a slave escapement wheel for driving from a primary power source, said slave wheel being mounted on a slave arbor, a master escapement wheel, said master wheel being mounted axially of said slave wheel on a master arbor alined with said slave arbor, a torsion spring for transmitting a predetermined relatively constant force from said slave arbor to said master arbor for delivery as energy impulses to a balance associated with said master escapement wheel, said spring being mounted coaxially of said arbors in torque transmitting relation therewith, a pawl associated with said master wheel for delivering the said impulses to the associated balance as an incident to regulating the motion of the master wheel at a constant timekeeping rate, a cam mounted on the same arbor for motion in unison with the said master escapement wheel, and means connecting said cam and said slave escapement pawl for oscillating the same in response to and in accord with the motion of said master escapement wheel for controlling the timed release of said slave escapement wheel in accord with the constant timekeeping rate of the master.

5. In a constant torque escapement for a time device driven by a power source, the combination comprising, a frame, a gear rotatably mounted on the frame and connected to said time device, a slave escapement mechanism mounted on the frame and connected to regulate the movement of said gear, said slave escapement mechanism including an escapement wheel and pawl means for releasing the wheel mounted on the frame, and means for controlling the motion of said slave escapement mechanism, said last-named means comprising a master escapement mechanism mounted on the frame and operating at a constant timekeeping rate, said master escapement mechanism including an escapement wheel and balance means for controlling the rotation of said master escapement wheel, means for transmitting to said master escapement mechanism a light, substantially constant torque derived from said power source, and cam means continuously coupled to the master escapement wheel so that movement of said master escapement wheel between positions of impulse to the balance means and independently of the latter operates said slave escapement pawl means to release the slave escapement wheel in accord with the timekeeping rate of the master.

6. In a constant torque escapement for a time device driven by a power source, the combination comprising, a frame, a gear rotatably mounted on the frame and connected to said time device, a first escapement wheel mounted on the frame and connected to regulate the movement of said gear, a pawl pivotally mounted on the frame for controlling the release of said wheel, and means for controlling the motion of said pawl comprising a master escapement mechanism mounted on the frame and operating at a constant timekeeping rate, said master escapement mechanism including a master escapement wheel and balance means for controlling the motion of the latter, means for transmitting to said master escapement wheel a light, substantially constant torque derived from said power source, and cam means operably coupled to said first escapement pawl and continuously coupled to the master escapement wheel so that movement of said master escapement wheel between positions of impulse to said balance means and independently of the latter releases the first escapement wheel in accord with the timekeeping rate of the master.

7. In a constant torque escapement for a time device driven by a power source, the combination comprising, a slave escapement mechanism connected to regulate the movement of said time device, and means for controlling the motion of said slave escapement mechanism including a master escapement wheel, means for transmitting to said master escapement wheel a substantially constant, light torque derived from said power source, balance means for controlling the motion of said master escapement wheel, and cam means connected to said slave escapement mechanism and continuously coupled to the master escapement wheel so that movement of said master escapement wheel between positions of impulse to said balance means and independently of the latter controls the motion of said slave escapement mechanism in accord with the timekeeping rate of the master.

8. In a constant torque escapement for a time device driven by a power source, the combination comprising, a frame, a slave escapement including an escapement wheel mounted on the frame and connected to said time device, pawl means movably mounted on the frame and connected to said slave escapement wheel, a master escapement mounted on the frame having an escapement wheel, means for transmitting to said master escapement wheel a torque derived from said power source, balance means including a pawl associated with said master escapement wheel and arranged for receiving impulses from the latter, and cam means for releasing the slave escapement wheel so that the latter turns in accord with the time keeping rate of the master, said cam means being carried by the master escapement wheel and having lobes to operate said slave escapement pawl means by the movement of said master escapement wheel during the periods of detached travel of the latter from one position of impulse to the next.

9. In a constant torque escapement for a time device driven by a power source, means for obtaining a constant timekeeping rate by delivering impulses of uniform strength to an associated balance irrespective of variations in torque input, comprising in combination, a first escapement mechanism connected to said time device and driven by said power source, a second escapement mechanism including an escapement wheel and a pawl for receiving impulses from said wheel for delivery to said balance and, in turn regulating the movement of the escapement wheel, said movement being intermittent and at a constant timekeeping rate, cam means including a cam mounted on said escapement wheel and pawl means operated by said cam for regulating the timekeeping rate of movement of said first escapement mechanism, said pawl means being operated by said cam during the free movement of the master escapement wheel from one position of impulse to the next, and torque transmitting means coupling said escapement mechanisms, the said torque transmitting means impressing a light, substantially constant average torque derived from the power source on the second escapement mechanism.

References Cited in the file of this patent

UNITED STATES PATENTS

| 51,414 | Billon | Dec. 12, 1865 |
| 1,237,216 | Oeth | Aug. 14, 1917 |

FOREIGN PATENTS

| 912,796 | Germany | June 3, 1954 |